(12) United States Patent
McWilliams

(10) Patent No.: US 7,518,792 B2
(45) Date of Patent: Apr. 14, 2009

(54) METHOD OF DETERMINING ORIENTATION OF A TELESCOPE

(75) Inventor: Rick McWilliams, Ventura, CA (US)

(73) Assignee: Bushnell Inc., Overland Park, KS (US)

( * ) Notice: Subject to any disclaimer, the term of this patent is extended or adjusted under 35 U.S.C. 154(b) by 306 days.

(21) Appl. No.: 11/150,806

(22) Filed: Jun. 10, 2005

(65) Prior Publication Data

US 2005/0225854 A1    Oct. 13, 2005

Related U.S. Application Data

(63) Continuation-in-part of application No. 10/438,127, filed on May 14, 2003, now abandoned.

(51) Int. Cl.
*G02B 23/00* (2006.01)
*G01C 21/24* (2006.01)
(52) U.S. Cl. .................. 359/399; 359/900; 701/222
(58) Field of Classification Search ................ 359/399, 359/429, 430; 250/203.1; 342/357.08
See application file for complete search history.

(56) References Cited

U.S. PATENT DOCUMENTS

| 4,764,881 | A | * | 8/1988 | Gagnon | 700/302 |
| 5,177,686 | A | * | 1/1993 | Boinghoff et al. | 701/226 |
| 5,525,793 | A | * | 6/1996 | Holmes et al. | 250/203.6 |
| 5,745,869 | A | * | 4/1998 | van Bezooijen | 701/222 |
| 5,935,195 | A | * | 8/1999 | Quine | 701/222 |
| 6,266,616 | B1 | * | 7/2001 | Needelman | 701/222 |
| 6,366,212 | B1 | * | 4/2002 | Lemp | 340/815.4 |

OTHER PUBLICATIONS

Dyer, Alan, SkySensor 2000-PC a la Carte To Go [online], Apr. 2000 [retrieved on Dec. 15, 2001], Sky and Telescope, Retrieved from the Internet:< URL: htttp://www.skypub.com/resources/testreports/accessories/0004skysensor.html>.*
Laughton, Paul, Vixen SkySensor 2000 Product Review [online], [retrieved on Aug. 14, 2007], Retrieved from the Internet:< URL:http://www.laughton.com/paul/rfo/ss2000.html>.*
User's Guide to SkySensor 2000 [online], [retrieved on Aug. 3, 2007], Retrieved from the Internet:< URL:http://24.237.160.4/files/Astronomy/Mounts/Vixen/Sky-Sensor2k/index.html>.*

* cited by examiner

*Primary Examiner*—Alessandro Amari
*Assistant Examiner*—Mark Consilvio
(74) *Attorney, Agent, or Firm*—Hovey Williams LLP

(57) ABSTRACT

An automatic telescope (10) capable of determining an orientation without requiring input from a user or any external source. The telescope (10) preferably includes a database (22) to store astronomical information, a processor (24) to control a drive mechanism (18), a vision device (30) to sense bright stars, and a motion sensor (32) to generate a motion signal. When the vision device (30) is slewed from alignment with a first bright star to a second bright star, the motion signal is preferably representative of a measured angle between the first and second bright stars. This process is preferably repeated for several bright stars to generate several measured angles. The processor (24) can then use the measured angles to identify the bright stars and determine the orientation of the telescope (10).

10 Claims, 5 Drawing Sheets

Matrix of Central Angles

|   | Sirius | Canopus | Rigil K | Arcturus | Vega | Capella |
|---|---|---|---|---|---|---|
| Sirius | X | 72.5 | 176.8 | 232.5 | 315.7 | 131.7 |
| Canopus | 72.5 | X | 116.1 | 244.2 | 331.8 | 199.4 |
| Rigil K | 176.8 | 116.1 | X | 160.3 | 221.4 | 305.8 |
| Arcturus | 232.5 | 244.2 | 160.3 | X | 118.2 | 206.1 |
| Vega | 315.7 | 331.8 | 221.4 | 118.2 | X | 186.7 |
| Capella | 131.7 | 199.4 | 305.8 | 206.1 | 186.7 | X |

FIG. 3

METHOD OF DETERMINING ORIENTATION OF A TELESCOPE

RELATED APPLICATION

The present application is a continuation-in-part patent application and claims priority benefit, with regard to all common subject matter, of earlier-filed U.S. nonprovisional patent application titled "AUTOMATIC TELESCOPE," Ser. No. 10/438,127, filed May 14, 2003 now abandoned. The identified earlier-filed application is hereby incorporated by reference into the present application.

BACKGROUND OF THE INVENTION

1. Field of the Invention

The present invention relates to telescopes. More particularly, the present invention relates to an automatic telescope that can align itself in order to view a specified star.

2. Description of Prior Art

Many telescopes are capable of finding and tracking stars and other celestial bodies. However, these telescopes must be initially oriented and re-oriented each time they are moved. Therefore, users are typically required to provide such telescopes with orientation information, such as an altitude angle and an azimuth angle. Unfortunately, many users are not familiar with or do not want to be bothered with providing such information.

Additionally, such telescopes typically only have small hard-to-use interfaces, such as handheld remote controls. While these remote controls are adequate for some purposes, they can be difficult to use, further increasing the inconvenience of providing orientation information.

Accordingly, there is a need for an improved automatic telescope that overcomes the limitations of the prior art.

SUMMARY OF THE INVENTION

The present invention overcomes the above-identified problems and provides a distinct advance in the art of telescopes. More particularly, the present invention provides an automatic telescope capable of determining an orientation without requiring input from a user or an external source. Additionally, the telescope may automatically align itself with virtually any star, planet, or other celestial object specified by the user. The telescope broadly comprises an optical telescopic tube for magnifying distant objects, a base for supporting the tube, a cradle for securing the tube to the base, a drive mechanism for moving the tube with respect to the base, and a control unit to control the drive mechanism.

The control unit preferably includes a database to store astronomical information and a processor to align the tube with the specified star using the drive mechanism. The database preferably includes information about stars, planets, and other celestial objects, such as nebulae. The information preferably includes location information and details relating to each celestial object, such as position, size, magnitude, type of object, and identification information.

The control unit also preferably includes a vision device to electronically sense bright stars and a motion sensor to sense motion of the tube of the telescope. The vision device is preferably securely aligned with the tube and may be secured to the tube or the cradle. The vision device preferably generates a vision signal representative of an image in the vision device's field of view. Therefore, when the tube and the vision device are pointed at a first bright star, the vision signal is representative of the first bright star.

Similarly, the motion sensor is preferably securely aligned with the tube and may be secured to the tube or the cradle. The motion sensor preferably generates a motion signal representative of changes in altitude and azimuth angles of the tube. Therefore, as the tube is slewed from alignment with the first bright star to a second bright star, the motion signal is preferably representative of that motion comprising the changes in the altitude and azimuth angles between the first bright star and the second bright star. The changes in the altitude and azimuth angles constitute a measured angle between the first bright star and the second bright star.

In use, a user initializes the telescope by turning on the telescope, pressing one of a plurality of buttons of the control unit, or simply supplying power. Upon initialization, the processor directs the drive mechanism to scan the sky until the vision device senses the first bright star. The first bright star is then substantially centered within the vision device's field of view and the motion signal is initialized.

It is important to note that, as used here, the first bright star does not relate to any specific star. The first bright star only implies that the first bright star is actually sensed first, upon initialization. As such, the first bright star may actually be a different star each time the telescope is initialized. Furthermore, the first bright star may actually be a planet or another celestial object that is brighter than surrounding space. The same principal applies to the second bright star and any other bright stars sensed by the telescope.

After initializing the motion signal, the processor directs the drive mechanism to scan the sky in search of the second bright star. Once the vision device has sensed the second bright star, the processor fine tunes the drive mechanism to substantially center the second bright star in the vision device's field of view. The processor then copies the measured angle from the motion signal. This process is preferably repeated until several measured angles provide a unique solution, from which the orientation of the telescope may be determined.

For example, the processor compares the measured angles with a matrix stored in the database to determine the orientation of the telescope. Specifically, when the processor matches the measured angles with a portion of the matrix, the bright stars associated with the measured angles have been identified. Once the bright stars are identified, the processor can use the location information of the bright stars to determine the orientation of the telescope. It is important to note that the user has not been required to provide any information to the telescope, such as location, orientation, or date.

Once the orientation is known, the processor may then find virtually any star or other celestial object specified by a user. For example, the user preferably identifies a specified star using buttons of the control unit. The processor searches the database to find location information for the specified star. The processor then instructs the drive mechanism to align the tube with the specified star. The processor may use the vision signal to fine tune the drive mechanism in order to substantially center the specified star within the tube's field of view.

BRIEF DESCRIPTION OF THE DRAWINGS

A preferred embodiment of the present invention is described in detail below with reference to the attached drawing figures, wherein:

FIG. 3 is a portion of a matrix comprising central angles between known stars that may be used by and stored in the control unit;

DETAILED DESCRIPTION OF A PREFERRED EMBODIMENT

Figure 1:
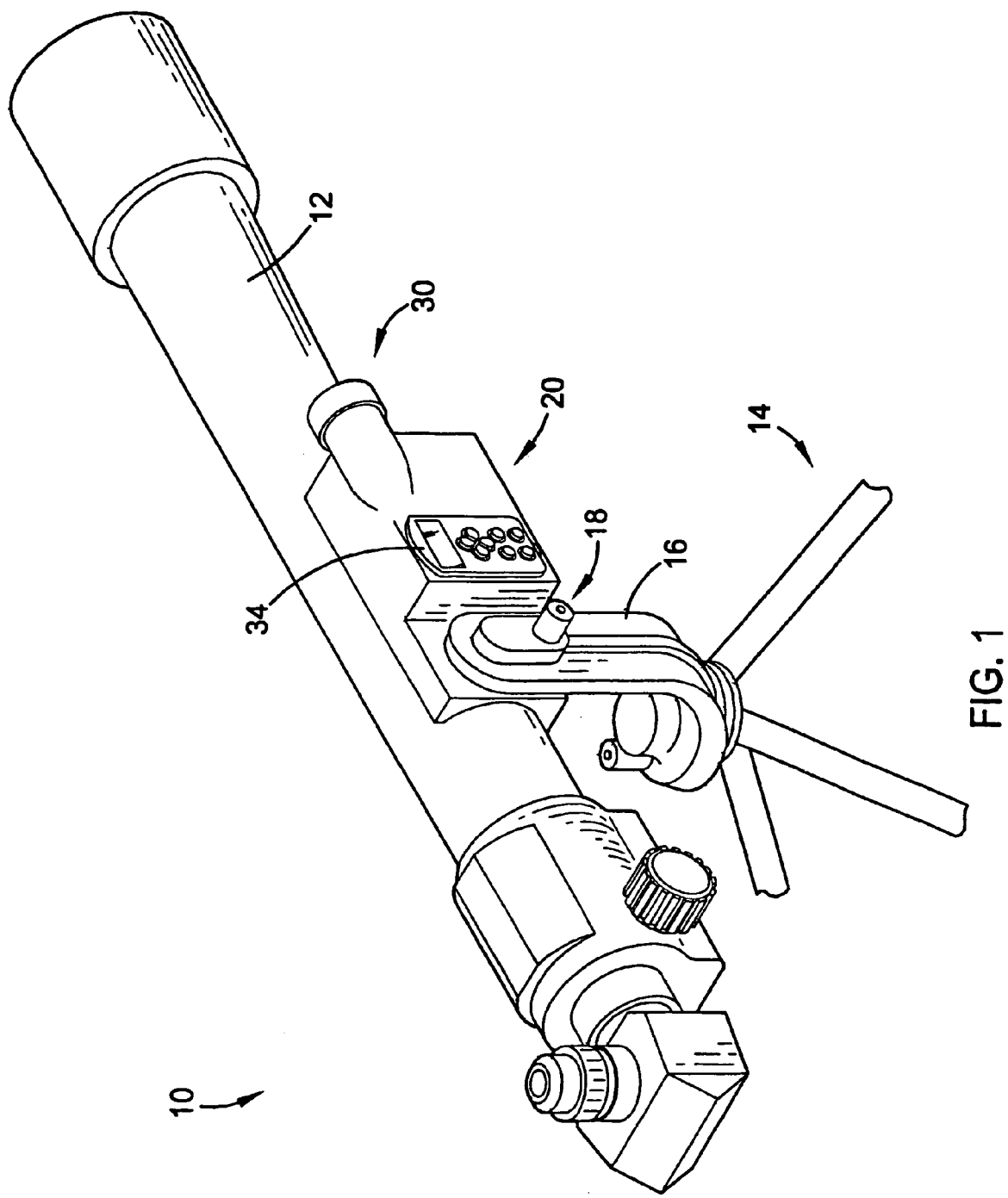
FIG. 1 is a perspective view of a preferred embodiment of an automatic telescope of the present invention.

Referring to FIG. 1, the preferred automatic telescope 10 constructed in accordance with a first embodiment of the present invention is illustrated as a stand-alone system capable of determining an orientation of the telescope 10 without requiring input from a user. Additionally, the telescope 10 may automatically align itself with virtually any star or other celestial object specified by the user. As such, the telescope 10 of the present invention preferably incorporates capabilities shown in "AUTO-ALIGNMENT TRACKING TELESCOPE MOUNT", U.S. Pat. No. 6,369,942, hereby incorporated into the present application by reference. The telescope 10 broadly comprises an optical telescopic tube 12 for magnifying distant objects, a base 14 for supporting the tube 12, a cradle 16 for securing the tube 12 to the base 14, a drive mechanism 18 for moving the tube 12 with respect to the base 14, and a control unit 20 to control the drive mechanism 18.

The tube 12 is preferably conventional with manual focus and zoom functions. Alternatively, the tube 12 may incorporate automatic focus and/or automatic zoom functions controlled by the control unit 20. Furthermore, the tube 12 may incorporate other electrical components, such as those discussed below and associated with the control unit 20.

The base 14 is preferably a conventional tri-pod, but may be a base-plate designed to be mounted to a support surface. The cradle 16 may comprise a conventional yoke mounting assembly or another support assembly that allows the tube 12 to move with respect to the base 14. The drive mechanism 18 preferably comprises a plurality of stepper motors to govern an altitude angle and an azimuth angle of the tube 12 with respect to the base 14.

Figure 2:
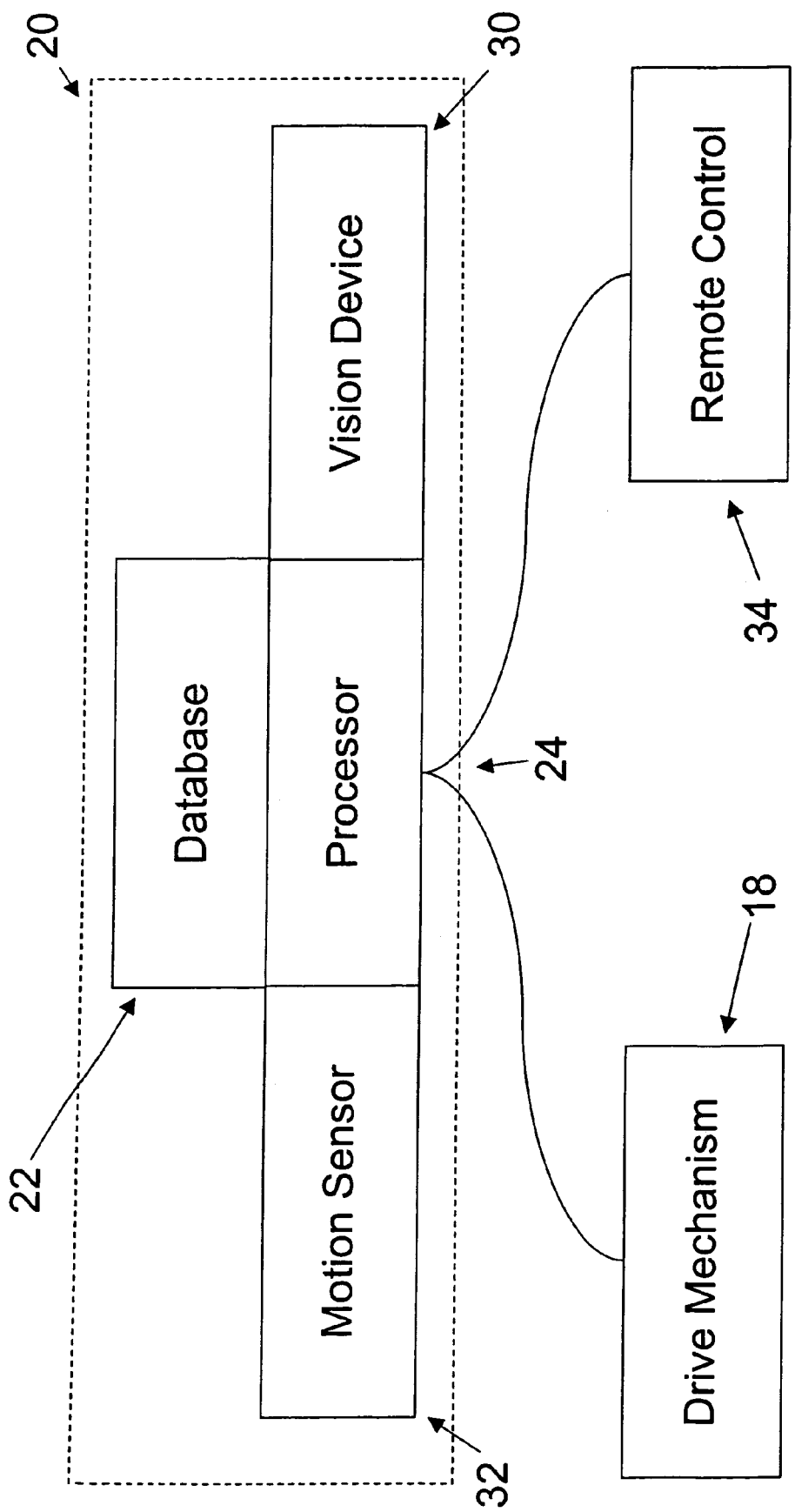
FIG. 2 is a block diagram of a control unit of the telescope.

Referring to FIG. 2, the control unit 20 preferably includes a database 22 to store astronomical information and a processor 24 to align the tube 12 with a specified star using the drive mechanism 18. The database 22 preferably includes information about stars and other celestial objects, such as nebulae. The information preferably comprises relational location information, such that each celestial object's location is described in relation to other celestial bodies. Alternatively, the location information may include an orbital path for each celestial object with respect to some reference point, such as the earth, the moon, or the sun. The information preferably also includes details relating to each celestial object, such as position, size, magnitude, type of object, and identification information for each object.

The control unit 20 also preferably includes a vision device 30 to electronically sense bright stars and a motion sensor 32 to sense motion of the tube 12 of the telescope 10. The vision device 30 is preferably securely aligned with the tube 12 and may be secured to the tube 12 or the cradle 16. In fact, the vision device 30 and the tube 12 preferably share substantially identical fields of view. However, while the vision device 30 must move with the tube 12, the vision device 30 may be oriented at an angle to the tube 12. For example, the vision device 30 may be oriented at up to ninety degrees with respect to the tube 12. Such a modification may provide the vision sensor 30 with a less obstructed field of view.

In either case, the vision device 30 preferably comprises a charge-coupled device (CCD) camera, but may comprise some other optical sensor. The vision device 26 preferably generates a vision signal representative of an image in the vision device's field of view. Thus, when the tube 12 and the vision device 30 are aligned and pointed at a first bright star the vision signal is representative of the first bright star.

Similarly, the motion sensor 32 is preferably securely aligned with the tube 12 and may be secured to the tube 12 or the cradle 16. The motion sensor 32 preferably comprises two motion encoders, one encoder to sense changes in an altitude angle and one encoder to sense changes in an azimuth angle of the tube 12. The motion sensor 32 preferably generates a motion signal representative of changes in the altitude and azimuth angles. Therefore, when the tube 12 is slewed from alignment with the first bright star to a second bright star, the motion signal is preferably representative of a measured angle between the first and second bright stars comprising the altitude and azimuth angles between the first and second bright stars.

It is important to note that, as used here, the first bright star does not relate to any specific unique star. The first bright star only implies that the first bright star is actually sensed first, upon initialization. As such, the first bright star may actually be a different star each time the telescope 10 is initialized. In addition, the first bright star may actually be a planet or another object that is brighter than surrounding space. The same principal applies to other bright stars sensed by the telescope 10.

The processor 24 uses measured angles, such as that described above, to calculate the orientation of the telescope 10. To this end, referring to FIG. 3, the database 22 preferably contains a matrix of central angles between all known stars. For example, a first known star has a first central angle with respect to a second known star, a second central angle with respect to a third known star, and a third central angle with respect to a fourth known star. In addition, the second known star also has a fifth central angle with respect to the third known star, a sixth central angle with respect to the fourth known star, and so on. Specifically, for n bright stars, there are preferably $(n^2-n)/2$ central angles stored in the matrix. Alternatively, the matrix may store vertex angles between the known stars. For efficiency, the angles stored in the matrix are preferably limited to those having a magnitude greater than two degrees.

It should be obvious that, since the goal of the present invention is to determine the orientation of the telescope 10, the processor 24 is expected to determine which known star corresponds to the first bright star. Additionally, if the measured angle between the first and second bright stars exactly and uniquely matches one of the central angles in the database 22, the processor 24 still must determine which bright star corresponds to which known star.

In order to accomplish this, the processor 24 preferably compares several measured angles with the central angles stored in the matrix of the database 22. When the processor 24 finds sufficient matches between the measured angles and the central angles, with sufficient certainty as will be discussed in greater detail below, then the processor 24 has effectively identified the bright stars using the bright stars' relationship to one another. Once the bright stars are identified, the processor 24 can use the location information of the bright stars to determine the orientation of the telescope 10.

For example, a set measured angles between several bright stars is compared to the central angles in the matrix. Any measured angles that nearly match the central angels result in a non-zero objective function score, which will be discussed in greater detail below, and are used to determine the orientation of the telescope 10.

For amateur astronomy purposes, we can assume that the stars are fixed, with respect to each other and the earth. This assumption greatly simplifies the matrix, allowing the matrix to store fixed values for the central angles, as shown in FIG. 3. However, for more advanced purposes, the matrix may be date dependant. For example, the matrix may comprise relational functions using the date as a variable, thereby compensating for relative movement between the stars, the planets, and the earth. The telescope 10 may, include a real time clock, receive the date from the user, or determine the date from positions of the bright stars or planets.

The processor 24 automatically compensates for relative movement of objects used as bright stars, even if the matrix does not account for relative movement. For example, it can be assumed that there will be some degree of error between the measured angles and the central angles stored in the database 22. Thus, as the processor 24 attempts to match the measured angles to the central angles, the processor 24 assigns an objective function score to each potential match. As discussed above, any measured angles that nearly match the central angles result in the non-zero objective function score. For instance, if the measured angle exactly matches one of the central angles, then the objective function score for that match is one. Alternatively, if the measured angle varies from a closest central angle by one or more degrees, then the objective function score for that match is zero and that match is effectively ignored. For matches with errors between zero and one degrees, the objective function score for those matches varies linearly between one and zero. In this manner, each central angle in the matrix is preferably compared with the each measured angle to determine the objective function score for each measured angle. Then, the objective function score may be determined for the set of measured angles. Accuracy may be further refined by multiplying the objective function score for each measured angle by the objective function score for the set of measured angles. Such refinement emphasizes close matches, while highlighting questionable matches.

Planets are often very bright, and therefore may be sensed as the bright stars. However, the planets typically have much more relative movement, with respect to the earth, than do most stars. Thus, when planets are used as bright stars, the matrix preferably compensates for this relative movement and is date dependent. Alternatively, the planets may simply be ignored when determining the location and orientation. For example, measured angles involving planets are not likely to sufficiently match any of the central angles in the matrix, if the matrix is not date dependent. Thus, measured angles involving planets are likely to vary by more than one degree from the central angles, resulting in the objective function score for any potential match being zero and those matches being ignored by the processor 24. This is especially apparent when one realizes that the processor 24 is comparing the measured angles between several bright stars.

The control unit 20 also preferably includes a handheld remote control 34 that includes a display and a plurality of buttons allowing the user to interact with the telescope 10. The remote control 34 preferably communicates with the control unit 20 over a wired connection, but may communicate over a wireless connection.

In use, the user initializes the telescope 10 by turning on the telescope 10, pressing one of the buttons on the remote control 34, or simply supplying power. Upon initialization, the processor 24 directs the drive mechanism 18 to scan they sky until the vision device 30 senses the first bright star.

The processor 24 preferably senses the first bright star by analyzing the vision signal. For example, the processor 24 analyzes the vision signal to find spots in the sky that are significantly brighter than other light emitting or reflecting bodies. These bright spots are assumed to be and used as bright stars. For example, the vision device 30 may provide a wide-angle view of the sky, from which the processor 24 may sense several bright stars. In this case, the processor selects one of the bright stars as the first bright star.

Alternatively, the drive mechanism 18 may scan the sky by varying the altitude angle, the azimuth angle, or both. For example, the drive mechanism 18 may use one of a plurality of predefined search methods, or a random search method, to sense the bright stars. One predefined search method comprises pivoting the tube 12 through 360 degrees of azimuth angle, incrementing the altitude angle slightly, and then repeating this process. The random search method preferably comprises changing the altitude azimuth angles substantially randomly until the first bright star is sensed.

In either case, once the vision device 30 has sensed the first bright star, the processor 24 fine tunes the drive mechanism 18 to substantially center the first bright star within the vision device's 30 field of view. Once the processor 24 centers the first bright star within the vision device's 30 field of view, the processor 24 initializes the motion signal. Then, the processor 24 directs the drive mechanism 18 to once again scan the sky in search of the second bright star. Once the vision device 30 has found the second bright star, the processor 24 fine tunes the drive mechanism 18 to substantially center the second bright star in the vision device's 30 field of view and temporarily stores the measured angle copied from the motion signal. This process is preferably repeated for several bright stars until the measured angles between the bright stars provide a unique solution, from which the orientation may be determined. While it may be possible to determine the unique solution with as few as two bright stars, it is anticipated that more bright stars and several measured angles will typically be required. In fact, the telescope preferably senses four bright stars and uses six measured angles between the four bright stars to determine the orientation of the telescope 10.

Once the orientation of the telescope 10 is known, the processor 24 may then find virtually any star or other celestial object specified by the user. For example, the user preferably identifies the specified star using the remote control 34, by selecting the specified star from a list or entering the specified star's name. The processor 24 searches the database 22 to find location information for the specified star. The processor 24 then instructs the drive mechanism 18 to align the tube 12 with the specified star. The processor 24 may use the vision signal to fine tune the drive mechanism 18 in order to substantially center the specified star within the tube's 12 field of view.

Figure 4:
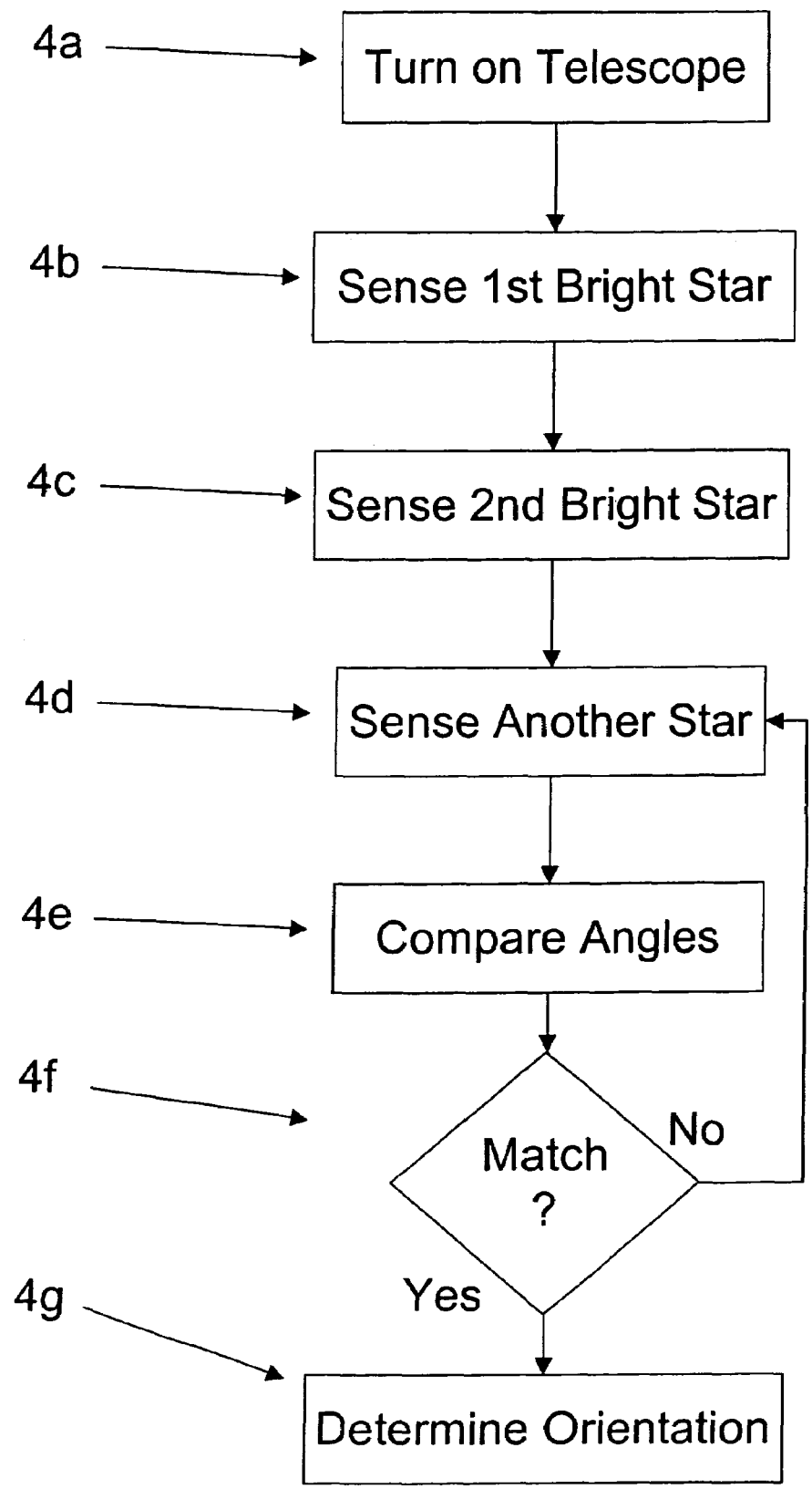
FIG. 4 is flow chart showing a preferred orientation determination procedure used by the telescope.
Figure 5:
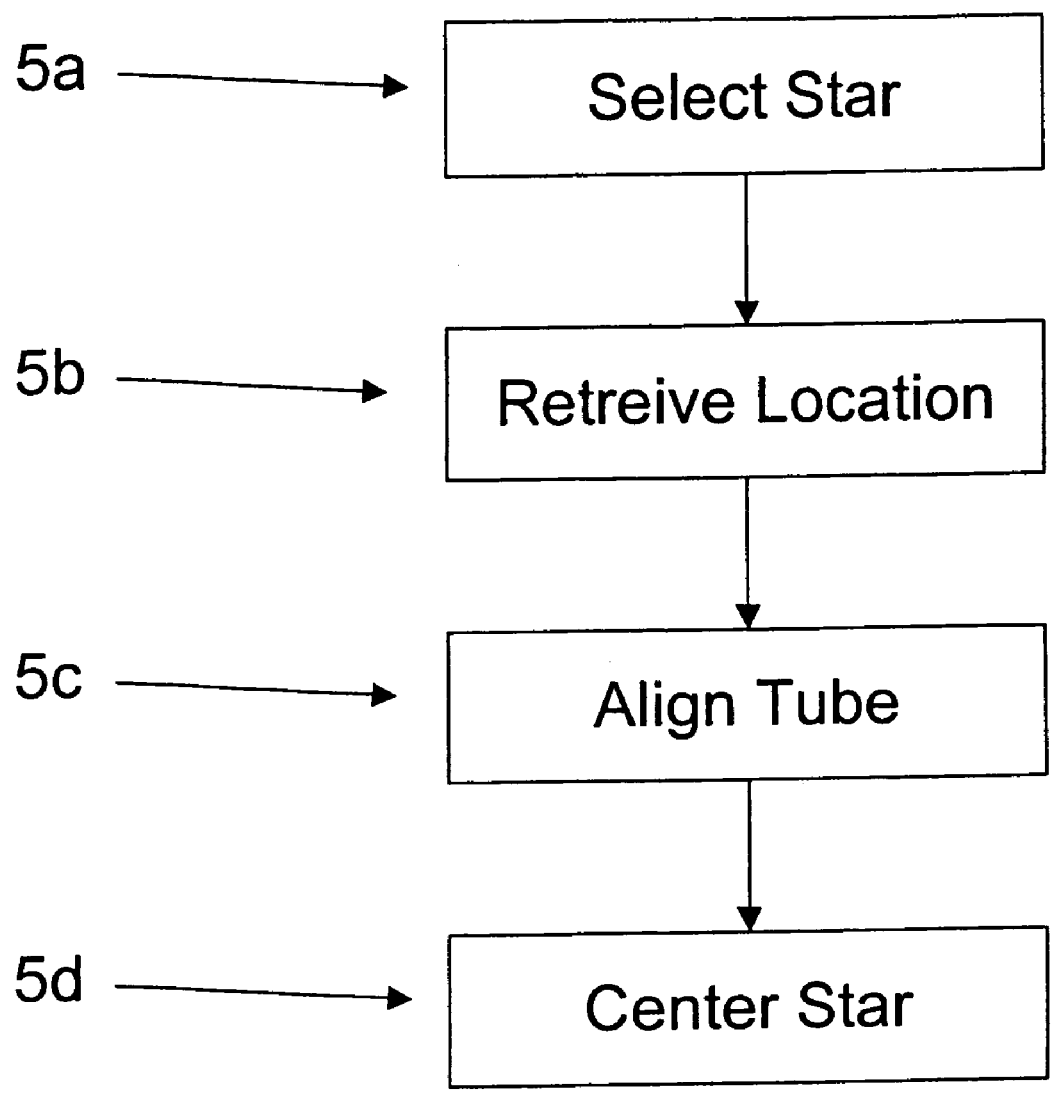
FIG. 5 is flow chart showing a preferred star tracking procedure used by the telescope.

The flow charts of FIGS. 4-5 show the functionality and operation of a preferred implementation of the present invention in more detail. In this regard, some of the blocks of the flow charts may represent a module segment or portion of code of a program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

Referring to FIG. 4, the user initializes the telescope 10, as depicted in step 4a. The telescope 10 senses the first bright star and initializes the motion signal, as depicted in step 4b. Then, the telescope 10 senses the second bright star and copies the measured angle from the motion signal, as depicted in step 4c. Then, the telescope 10 senses another bright star and copies another measured angle from the motion signal, as depicted in step 4d. When the processor 24 has at least two measured angles, the processor 24 compares the measured angles with the central angles in the matrix of the database 22 using the objective function score, as depicted in step 4e. If the processor 24 does not find the unique solution, the telescope 10 repeats steps 4d-e. If the processor 24 finds the unique solution, then the processor 24 has identified the bright stars and may determine the orientation of the telescope 10 using the information stored in the database 22, as depicted in step 4f.

Referring to FIG. 5, once the orientation of the telescope 10 is known, the user may enter the specified star using the remote control 34, as depicted in step 5a. The processor 24 retrieves location information for the specified star from the database 22, as depicted in step 5b. Then, the processor 24 instructs the drive mechanism 18 to align the tube 12 with the specified star, as depicted in step 5c. The processor 24 may fine tune the drive mechanism 18 to substantially center the specified star within the tube's 12 field of view using the vision device 30, as depicted in step 5d. At this point, the user may view the specified star through the tube 12.

In a second embodiment of the present invention, the telescope 10 is adapted to allow the user to manually align the tube 12 with bright stars or other celestial objects in addition to automatically scanning the sky for celestial objects. In the second embodiment, for example, the telescope 10 may include a switch that is part of the control unit 20 and is operable to selectively allow the telescope 10 to be slewed manually or via the drive mechanism 18. This embodiment has the advantage of presenting a faster method of orienting the telescope, as the user will be able to quickly identify the locations of several celestial objects and successively align the tube 12 with each celestial object.

According to the second embodiment, the telescope 10 determines its orientation in a manner substantially similar to that of the first embodiment described above, except that the motion sensor 32 senses motion of the tube 12 caused by a user manually (i.e., by hand) rotating the tube 12. A user may select a plurality of celestial objects, for example, and rotate the tube 12 to align with a first celestial object, then a second celestial object, then a third celestial object, etc. As the user rotates the telescope tube 12, the motion sensor 32 generates a motion signal representative of a measured angle between each of the celestial objects.

While various embodiments of the present invention have been described above, it is understood that substitutions can be made. For example, depending on the quality of the vision device 30, the tube 12 may not be required. In this case, the user may view the display or another screen which displays the image from the vision device 30. The telescope 10 may not even require the tube 12 or the vision device 30 to actually move, in order to determine the orientation of the telescope 10. For example, the vision device 30 may simply take a wide-angle snap-shot of the sky and sense several bright stars from the snap-shot. In this case, the measured angles may be inferred by spacing of bright stars in the snap-shot. Additionally, the drive mechanism 18 may use other types of motors and may include gears and other components commonly found in typical drive mechanisms. Furthermore, the database 22 may only include information about selected celestial bodies, such as constellations. These and other minor modifications are within the scope of the present invention.

Having thus described preferred embodiments of the invention, what is claimed as new and desired to be protected by Letters Patent includes the following:

1. A method of determining a telescope's orientation, the method comprising the steps of:
   manually aligning the telescope with a first user-selected celestial object;
   manually aligning the telescope with a second user-selected celestial object;
   determining a first central angle between the first celestial object and the second celestial object;
   manually aligning the telescope with a third user-selected celestial object;
   determining a second central angle between the second celestial object and the third celestial object;
   using a computer processor to compare the central angles with central angles between celestial objects stored in a database, thereby identifying the celestial objects; and
   using the computer processor to determine the orientation of the telescope by analyzing known locations of the celestial objects.

2. The method as set forth in claim 1, further comprising detecting a third measured angle between the third celestial object and the first celestial object.

3. The method as set forth in claim 1, wherein at least four celestial objects and six measured angles are used to determine the orientation of the telescope.

4. The method as set forth in claim 1, further including the step of receiving an identity of a specified celestial object.

5. The method as set forth in claim 4, further including the step of retrieving the specified celestial object's location from the database.

6. The method as set forth in claim 5, further including the step of comparing the location of the specified celestial object with the orientation of the telescope in order to align the telescope with the specified celestial object.

7. The method as set forth in claim 6, further including the step of aligning the telescope with the specified celestial object.

8. The method as set forth in claim 7, further including the step of using signals received from a vision device to substantially center the specified star within the telescope's field of view.

9. The method as set forth in claim 1, wherein the measured angles are measured by monitoring motion as the telescope is slewed between the celestial objects.

10. A method of displaying a specified star through a telescope, the method comprising the steps of:
   manually aligning the telescope with a first user-selected celestial object;
   manually aligning the telescope with a second user-selected celestial object;
   monitoring motion as the telescope is slewed from alignment with the first celestial object to the second celestial object;
   determining a first central angle between the first celestial object and the second celestial object;
   manually aligning the telescope with a third user-selected celestial object;
   monitoring motion as the telescope is slewed from alignment with the second celestial object to the third celestial object;
   determining a second central angle between the second celestial object and the third celestial object;

manually aligning the telescope with the first celestial object;

monitoring motion as the telescope is slewed from alignment with the third celestial object to the first celestial object;

determining a third central angle between the third celestial object and the first celestial object;

comparing the central angles with central angles between celestial objects stored in a database, thereby identifying the celestial objects;

determining the orientation of the telescope by analyzing known locations of the celestial objects;

receiving indication of a specified celestial object;

retrieving the celestial object's location from the database; and aligning the telescope with the specified celestial object.

* * * * *